US007989548B2

(12) United States Patent
Descombes et al.

(10) Patent No.: US 7,989,548 B2
(45) Date of Patent: Aug. 2, 2011

(54) THERMOPLASTIC VULCANISATE BLEND

(75) Inventors: Vincent Descombes, Belegarde (FR); Philippe Leboeuf, St Maurice (FR); Jean-Michel Philippoz, Prangins (CH); Michel C. Renaud, Prangins (CH); Serge Cavalli, Echallon (FR)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/498,587

(22) Filed: Jul. 7, 2009

(65) Prior Publication Data
US 2010/0273945 A1    Oct. 28, 2010

Related U.S. Application Data

(62) Division of application No. 11/345,714, filed on Feb. 2, 2006, now abandoned.

(60) Provisional application No. 60/650,603, filed on Feb. 7, 2005.

(51) Int. Cl.
*C08L 67/02* (2006.01)

(52) U.S. Cl. ........ 525/177; 525/167; 525/173; 525/174; 525/176; 525/179

(58) Field of Classification Search .............. 525/167, 525/173, 174, 176, 177, 179
See application file for complete search history.

(56) References Cited

U.S. PATENT DOCUMENTS

| 4,981,908 | A |   | 1/1991  | Wolfe, Jr.       |        |
|-----------|---|---|---------|------------------|--------|
| 5,219,915 | A |   | 6/1993  | McKee et al.     |        |
| 5,550,190 | A | * | 8/1996  | Hasegawa et al.  | 525/92 A |
| 5,731,380 | A |   | 3/1998  | Golder           |        |
| 5,824,412 | A |   | 10/1998 | Hausmann         |        |
| 5,824,421 | A |   | 10/1998 | Kobayashi et al. |        |
| 6,444,753 | B1|   | 9/2002  | Mangnus et al.   |        |
| 6,774,162 | B1|   | 8/2004  | Vortkort         |        |
| 7,074,857 | B2| * | 7/2006  | Bendler et al.   | 525/176 |
| 7,275,574 | B2| * | 10/2007 | Watanabe et al.  | 152/450 |

FOREIGN PATENT DOCUMENTS

| EP | 0 614 575     | 8/1997 |
| EP | 0 922 730     | 5/2003 |
| WO | 01/21705      | 3/2001 |
| WO | 2004/029155   | 4/2004 |

* cited by examiner

*Primary Examiner* — Ana L Woodward

(57) ABSTRACT

The invention relates to a new polymer blend comprising:
  20 to 70 wt % of a mixture (A) of two or more polyalkylene phthalates;
  2 to 60 wt % of a cross-linked acrylate rubber;
  0.5 to 20 wt % of an ionomer; and
  1 to 30 wt % of a terpolymer of ethylene, butylacrylate (BA) and glycidylmethacrylate (GMA);
  wherein the weight percentages are based on the sum of the above ingredients.

The polymer blend of the invention is particularly suitable for blow-moulding, to make parts for high-temperature, high-oil-exposure uses.

3 Claims, No Drawings

THERMOPLASTIC VULCANISATE BLEND

CROSS REFERENCE TO RELATED APPLICATIONS

This application is a divisional of, and claims priority under 35 U.S.C. 120, to U.S. application Ser. No. 11/345,714, filed on 2 Feb. 2006 now abandoned, which claims the benefit of priority under 35 U.S.C. 119(e) to U.S. Provisional App. No. 60/650,603, filed 7 Feb. 2005 and now expired.

FIELD OF THE INVENTION

The invention relates to the field of polymers, particularly thermoplastic vulcanisates, and their use to make blow-moulded articles.

BACKGROUND OF THE INVENTION

Blow-moulding is the primary method to form hollow plastic objects such as soda bottles, air ducts and CVJ boots for automobiles, etc. Many variants of the blow-moulding process are known in the art and practiced by the industry. For instance, extrusion blow-moulding includes the steps of clamping the ends of a softened tube of polymer (a parison) in a mould, inflating the polymer against the mould walls with a blow pin, and cooling the product. This method is simple in terms of equipment, and is well-suited to parts with relatively simple geometry, like bottles and almost linear ducts.

Parison manipulation and suction blow-moulding are variants designed to produce ducts with complex three-dimensional geometries, that would be impossible or inefficient to make with straight extrusion blow-moulding. Coextrusion blow-moulding and sequential blow-moulding are designed to optimise the properties of final parts by placing different materials at the most appropriate position in the part. In coextrusion blow-moulding, the parison is made with two or more concentric layers of different materials. In sequential blow-moulding, the parison is made of different materials alternating along its length.

These variant processes are often used in combination, for example sequential coextrusion suction blow-moulding is used to make three-dimensional ducts with two different materials forming an inside and outside layer, these layers having varying thicknesses along the part.

Other blow-moulding methods include injection blow-moulding, as used for example to make bellows and CVJ boots for automotive applications, and stretch blow-moulding, as used to produce soda bottles.

Important factors for blow-moulding include:
Polymer viscosity at high & low shear rates
  Melt strength and sagging (important for uniform wall thickness, no holes)
  Crystallization rate (slow rate preferred).

These factors are especially important in order to obtain long blow-moulded articles in the extrusion blow-moulding process. They are also important for other blow-moulding processes like suction blow-moulding and sequential co-extrusion blow-moulding.

Thermoplastic vulcanisates (TPVs) are blends consisting of a continuous thermoplastic phase with a phase of vulcanised elastomer dispersed therein. TPVs combine many desirable characteristics of cross-linked rubbers with some characteristics of thermoplastic elastomers. TPVs are typically made using a process called Dynamic Vulcanisation or dynamic cross-linking, which involves mixing a thermoplastic component with a vulcanisable elastomer component, under shear at a temperature above the melting point of the thermoplastic component, in the presence of a cross-linking agent that will act to vulcanise the elastomer component. The rubber is thus at the same time cross-linked and dispersed within the thermoplastic matrix.

There are several commercially available TPVs, for example Santoprene® (Advanced Elastomer Systems) and Sarlink® (DSM) which are TPVs based on an ethylene-propylene-diene copolymer (EPDM) and polypropylene (PP), Nextrile® (Thermoplastic Rubber Systems) which is a TPV based on nitrile rubber and PP, and Zeotherm® (Zeon Chemicals) which is a TPV based on acrylate elastomer and polyamide.

The following documents disclose TPVs:

U.S. Pat. No. 6,774,162 (PolyOne Corporation) describes a TPV of four components (A, B, C, D), comprising a thermoplastic synthetic resin (A); a substantially cross-linked polyethylene (B); a rubber (C) having a degree of cross-linking of >90% and a plasticiser (D); as well as of standard blend ingredients (E) comprising at least one cross-linking agent or cross-linking system, whereby a mixture is comprised of the following quantitative proportions (in % by weight) based on the sum of the four components (A, B, C, D); thermoplastic synthetic resin (A) 5 to 20; polyethylene (B) 25 to 5; rubber (C) 30 to 50; plasticiser (D) 50 to 25; wherein the thermoplastic synthetic resin (A) is a propylene-based homopolymer, block polymer or copolymer with high crystallinity.

WO2001021705(A1) describes a TPV consisting of polypropylene, EPDM (polymer of ethylene, propylene and 5-ethylidene-2-norbornene in a ratio of 63/32.5/4.5 wt %), and oil. The TPV is compounded by melting in an extruder 60 parts by weight polypropylene, 100 parts by weight EPDM, and 140 parts by weight of an oil, and vulcanising.

EP0922730B1 (Advanced Elastomer Systems) describes a TPV consisting of a blend of ethylene acrylate rubber (Vamac GLS) and poly(butylene terephthalate) (Valox HR 326), dynamically vulcanised with a bisoxazoline curative, and a further TPV consisting of ethylene acrylate rubber (Vamac GLS) with a co-polyetherester (Hytrel® 8238).

WO 2004/029155 (E.I. DuPont de Nemours) discloses a curable thermoplastic blend comprising (a) from 15 to 60 wt % of a polyalkylene phthalate polyester polymer or copolymer and; (b) from 40 to 85 wt % of a cross-linkable poly (meth)acrylate or polyethylene/(meth)acrylate vulcanisate rubber in combination with an effective amount of peroxide free-radical initiator and an organic diene co-agent to cross-link the rubber during extrusion or injection moulding of the curable thermoplastic elastomeric blend. When the curable blend is melt extruded, the result is a TPV that can be processed in many ways like a thermoplastic, but which has the characteristics of a cross-linked rubber.

Although known TPVs have interesting properties, a continuing need exists for new TPVs that exhibit desirable characteristics for processes like blow-moulding, while having high performance characteristics, such as resistance to heat, wear, and resistance to oil and solvents. In particular, due to the tendency towards part and function integration for a reduced overall system cost, the automotive industry demands ever increasing performance from plastic materials, both in terms of processing and mechanical properties.

SUMMARY OF THE INVENTION

In a first aspect, the invention provides a polymer blend comprising:
  20 to 70 wt % of a mixture (A) of two or more polyalkylene phthalates;

2 to 60 wt % of a cross-linked acrylate rubber;
0.5 to 20 wt % of an ionomer; and
1 to 30 wt % of a terpolymer of ethylene, butylacrylate (BA) and glycidylmethacrylate (GMA).

wherein the weight percentages are based on the sum of the above ingredients.

In a second aspect, the invention provides a polymer blend comprising:
20 to 80 wt % of a mixture (A) of two or more polyalkylene phthalates;
2 to 60 wt % of a cross-linked acrylate rubber;
0 to 20 wt % of an ionomer; and
0 to 30 wt % of a terpolymer of ethylene, butylacrylate (BA) and glycidylmethacrylate (GMA).

wherein the weight percentages are based on the sum of the above ingredients.

In a third aspect, the invention provides a shaped or moulded article made from a polymer blend comprising:
20 to 70 wt % of a mixture (A) of two or more polyalkylene phthalates;
2 to 60 wt % of a cross-linked acrylate rubber;
0.5 to 20 wt % of an ionomer; and
1 to 30 wt % of a terpolymer of ethylene, butylacrylate (BA) and glycidylmethacrylate (GMA).

wherein the weight percentages are based on the sum of the above ingredients.

In a fourth aspect, the invention provides a shaped or moulded article made from a polymer blend comprising:
20 to 80 wt % of a mixture (A) of two or more polyalkylene phthalates;
2 to 60 wt % of a cross-linked acrylate rubber;
0 to 20 wt % of an ionomer; and
0 to 30 wt % of a terpolymer of ethylene, butylacrylate (BA) and glycidylmethacrylate (GMA).

wherein the weight percentages are based on the sum of the above ingredients.

In a fifth aspect, the invention provides a process for making an article comprising the step of extruding, blow-moulding or injection moulding a polymer blend comprising:
20 to 70 wt % of a mixture (A) of two or more polyalkylene phthalates;
2 to 60 wt % of a cross-linked acrylate rubber;
0.5 to 20 wt % of an ionomer; and
1 to 30 wt % of a terpolymer of ethylene, butylacrylate (BA) and glycidylmethacrylate (GMA).

wherein the weight percentages are based on the sum of the above ingredients.

In a sixth aspect, the invention provides a process for making an article comprising the step of extruding, blow-moulding or injection moulding a polymer blend comprising:
20 to 80 wt % of a mixture (A) of two or more polyalkylene phthalates;
2 to 60 wt % of a cross-linked acrylate rubber;
0 to 20 wt % of an ionomer; and
0 to 30 wt % of a terpolymer of ethylene, butylacrylate (BA) and glycidylmethacrylate (GMA).

wherein the weight percentages are based on the sum of the above ingredients.

In a seventh aspect, the invention provides a process for making a polymer blend comprising compounding in a melt extruder at a temperature sufficient to melt and mix all components:
a TPV component (X) comprising (X1) from 15 to 60 weight percent of a polyalkylene terephthalate polyester polymer or copolymer continuous phase and (X2) from 40 to 85 weight percent of a rubber disperse phase wherein said rubber is poly(meth)acrylate or a mixed polymer of ethylene and methyl acrylate dynamically cross-linked with an organic peroxide free radical initiator and an organic diene co-agent; and
a thermoplastic polyester component (Y) comprising (Y1) at or about 5-25% by weight of a copolyether-ester block copolymer elastomer, (Y2) at or about 40-65% by weight of poly(butylene terephthalate), (Y3) at or about 5-20% by weight of an ionomer, and (Y4) at or about 5-30% by weight of a terpolymer of ethylene, butylacrylate and glycidylmethacrylate; provided that: the total of (Y1)-(Y4) is 100%; and the total content of (Y1) and (Y2) does not exceed 70%;
wherein the wt % ratio of the TPV component (X) to the thermoplastic polyester component (Y) is from at or about 5:95 to at or about 95:5.

In an eighth aspect the invention provides a process for making a polymer blend comprising compounding in a melt extruder at a temperature sufficient to melt and mix all components:
25-95% of a TPV component (X) comprising (X1) from 15 to 60 weight percent of a polyalkylene terephthalate polyester polymer or copolymer continuous phase and (X2) from 40 to 85 weight percent of a rubber disperse phase wherein said rubber is poly(meth)acrylate or a mixed polymer of ethylene and methyl acrylate dynamically cross-linked with an organic peroxide free radical initiator and an organic diene co-agent; and
75 to 5% of a polyalkylene phthalate polyester different from (X1).

DETAILED DESCRIPTION OF PREFERRED EMBODIMENTS

Definitions

Copolymer refers to polymers containing two or more monomers. In the case of a polymer derived from alternating essential co-monomers, such as polyalkylene terephthalate polyester and the like, the term "copolymer" is used to refer to the presence of at least one additional monomer other than the essential co-monomers.

Terpolymer means that the copolymer has at least three different comonomers.

Vulcanisate and the phrase "vulcanisate rubber" as used herein are intended to be generic to the cured or partially cured, cross-linked or cross-linkable rubber as well as curable precursors of cross-linked rubber and as such include elastomers, gum rubbers and so-called soft vulcanisates as commonly recognized in the art.

Organic diene co-agent is intended to mean organic co-agents that contain two or more unsaturated double bonds.

Acrylate means an ester of acrylic acid with an alkyl group. Preferred in the invention are acrylates with alkyl groups having 1 to 4 carbon atoms.

The term "(meth)acrylic acid" refers to methacrylic acid and/or acrylic acid, inclusively. Likewise, the term "(meth)acrylate" means methacrylate and/or acrylate and "poly(meth)acrylate" means polymers derived from the polymerization of either or a mixture of both corresponding type of monomers.

The expressions "rubber phase" and "thermoplastic phase" as used herein refer to and mean the polymeric morphological phases present in the resulting thermoplastic elastomeric blends derived from mixing and dynamic cross-linking of the cross-linkable acrylate rubber and the polyalkylene phthalate polyester starting materials, according to the method of the present invention.

All documents referred to herein are incorporated by reference.

The polymer blend of the invention has many of the characteristics of a conventional (thermoset) rubber, while being suitable for thermoplastic processing methods like extrusion, moulding by injection or blow-moulding, particularly blow-moulding.

The mixture (A) may be a mixture of two components (A1) and (A2).

(A1) is a block copolyester elastomer, such as a copolyether-ester block copolymer elastomer or a copolyester-ester block copolymer elastomer. Copolyether-ester elastomers and copolyester-ester elastomers are described for example in U.S. Pat. Nos. 4,981,908, 5,824,421 and 5,731,380, the descriptions of which are incorporated herein by reference. Preferably (A1) is selected from block copolymers of poly(butylene terephthalate) and poly(tetramethylene glycol), block copolymers of poly(butylene terephthalate) and ethylene-oxide-capped poly(propylene glycol), and mixtures of such block copolymers. Most preferably (A1) is a block copolymer of segments of poly(butylene terephthalate) and segments of poly(tetramethylene glycol). Suitable block copolyester elastomers are sold under the tradenames Hytrel® (DuPont, Wilmington, USA) and Arnitel® (DSM, Netherlands). The block copolyester elastomer (A1) is preferably present at or about 5 to at or about 60 wt % with respect to the overall polymer blend.

(A2) is a poly(butylene terephthalate) (PBT). Preferably the PBT has a number average molecular weight of at least at or about 7500, most preferably greater than at or about 15000, but preferably less than at or about 150000. It is particularly preferred to use a PBT of number average molecular weight of at or about 25000. Suitable PBT component is sold under the tradenames Crastin® (DuPont, Wilmington, USA), Pocan® (Lanxess, Germany) and Arnite® (DSM, Netherlands). The PBT is preferably present at or about 2 to at or about 60 wt % with respect to the overall polymer blend.

Preferably the rubber is selected from poly(meth)acrylate and a mixed polymer of ethylene and methyl acrylate, most preferably it is a mixed polymer of ethylene and methyl acrylate. The rubber is cross-linked with a free-radical initiator (such as an organic peroxide) and an organic diene coagent. Preferably the rubber is a mixed polymer of ethylene and methyl acrylate, derived from the copolymerisation of ethylene and 63 wt % methyl acrylate. Suitable rubber is sold under the trade name Vamac® (DuPont, Wilmington, USA).

The organic diene co-agent is preferably selected from the group consisting of diethylene glycol diacrylate, ethylene glycol dimethacrylate, diethylene glycol dimethacrylate, N,N'-m-phenylene dimaleimide, triallylisocyanurate, trimethylolpropane trimethacrylate, tetraallyloxyethane, triallyl cyanurate, tetramethylene diacrylate, polyethylene glycol dimethacrylate, and the like. Preferably the organic diene co-agent is selected from diethylene glycol diacrylate, diethylene glycol dimethacrylate, N,N'-m-phenylene dimaleimide, and triallylisocyanurate. The organic diene co-agent is preferably present at or about 0.5-6 wt %, more preferably at or about 1.5-4 wt %, based on the rubber.

The free radical initiator is preferably an organic peroxide. More preferably the peroxide is selected from the group consisting of 2,5-dimethyl-2,5-di-(t-butylperoxy)hexyne-3, t-butyl peroxybenzoate, 2,5-dimethyl-2,5-di-(t-butylperoxy)-2,5-dimethylhexane, dicumyl peroxide, α,α-bis(t-butylperoxy) 2,5-dimethylhexane, and the like. Preferred free-radical initiators are 2,5 dimethyl-2,5-di-(t-butylperoxy) hexyne-3; 2,5-dimethyl-2,5-di-(t-butylperoxy)hexane; and t-butyl peroxybenzoate. The free-radical initiator is preferably present at or about 0.5-3 wt %, more preferably at or about 0.75-2.5 wt %, based on the rubber.

In another preferred embodiment, the cross-linked or cross-linkable rubber comprises copolymers of ethylene and methyl acrylate together with at least one other monomer with a reactive chemical group which can be cross-linked. Particularly preferred are monomers with carboxylate groups, which can be cross-linked with a diamine cross-linking agent.

The ionomer is preferably selected from random copolymers of ethylene and methacrylic acid [poly(ethylene-co-methacrylic acid)]. The acid moieties may be protonated, but are preferably neutralised from at or about 10 to 100 mol %, more preferably from at or about 25-80 mol %, particularly preferably at or about 30-70 mol %, with a counterion selected from $Na^+$ and $Zn^{++}$, with $Na^+$ preferred. A particularly preferred ionomer comprises 50-95% by weight of ethylene, 5-15% by weight of acrylic acid or methacrylic acid, and 0-35% by weight of a moiety selected from at least one of methyl acrylate, iso-butyl acrylate and n-butyl acrylate, and the acid groups are neutralized from 30-70% with a counterion of at least one metal ion selected from sodium and zinc, preferably sodium. Suitable ionomer may be purchased under the trade name Surlyn® (DuPont, Wilmington, USA).

The terpolymer is preferably selected from terpolymers of ethylene, butylacrylate (BA) and glycidylmethacrylate (GMA), wherein the three components are present in at or about the following weight percentages: ethylene 50-98 wt %, BA 1-40 wt %, and GMA 1-15 wt %. Particularly preferred is a terpolymer having the following composition: ethylene 55-88 wt %, BA 10-35 wt %, and GMA 2-10 wt %. Suitable terpolymer may be purchased under the trade name Elvaloy® (DuPont, Wilmington, USA).

Particularly preferred polymer blends of the invention have the following composition:
- at or about 12 to at or about 55 wt % copolyether-ester block copolymer elastomer, selected from block copolymers of poly(butylene terephthalate) and poly(tetramethylene glycol);
- at or about 2 to at or about 50 wt % PBT;
- at or about 2 to at or about 45 wt % of a mixed polymer of ethylene and methyl acrylate, dynamically cross-linked with a free radical initiator and an organic diene co-agent;
- at or about 0.5 to at or about 12 wt % of an ionomer selected from random copolymers of 50-95% by weight of ethylene (preferably 60-85 wt %), 5-15% (preferably 7-13 wt %) by weight of acrylic acid or methacrylic acid, and 0-35% by weight of n-butyl acrylate (preferably 10-25 wt %), the acid moieties being neutralised from at or about 25 to 80 mol %, more preferably at or about 30 to 70 mol % with a counterion selected from $Na^+$ and $Zn^{++}$, more preferably $Na^+$; and
- at or about 1 to at or about 25 wt % of a terpolymer of 50-98 wt % ethylene, 1-40 wt % n-butyl acrylate, and 1-15 wt % glycidylmethacrylate;

wherein the sum of copolyether-ester block copolymer elastomer and PBT is from at or about 45 to at or about 65 wt %.

In this and all compositions described above, the weight percentages refer to the sum of these 5 ingredients. Thermoplastic vulcanisate compositions of our invention may optionally comprise other additives known in the rubber or thermoplastic compounding arts, including plasticisers, stabilisers, antioxidants, ultraviolet ray-absorbers, hydrolytic stabilisers, anti-static agents, dyes or pigments, fillers, fire-retardants, lubricants, reinforcing agents such as glass fibres and flakes, processing aids, for example release agents, and/or mixtures thereof. Such additives can generally comprise up to 50% of the final TPV composition.

The polymer blend of the invention can be made by mixing the thermoplastic components and the vulcanisable rubber under shear at a temperature above the melting point of all thermoplastic components, in presence of the cross-linking agent and optional co-agent. Conventional melt blending equipment enable such operations to be carried out in batch mode (Method B) or in continuous mode in a melt extruder or injection moulding machine (Method C).

If dynamic cross-linking is to be carried out in batch mode (Method B), the thermoplastic components and the vulcanisable rubber are mixed in a melt blender at a temperature sufficient to melt all the components but below the temperature at which significant cross-linking would begin. Once a homogeneous melt is obtained, the cross-linking agent and optional co-agent are added and the mixing continues until the vulcanisation of the rubber is essentially completed, as can be inferred from the torque reading on the blender.

If dynamic cross-linking is to be carried out in continuous mode in a melt compounding machine (method C), the critical consideration is to achieve sufficient mixing and dispersion prior to cross-linking of the vulcanisable rubber, which may require to feed ingredients at different locations in the melt compounder.

Alternatively, a convenient way to manufacture the blend is by mixing in a melt extruder a TPV component (X) [previously dynamically cross-linked] with a thermoplastic polyester component (Y, designated below as TP component) (Method A). The wt % ratio of TPV component (X) to thermoplastic polyester component (Y) is preferably from at or about 5:95 to at or about 95:5, more preferably at or about 10:90 to at or about 90:10.

The TPV component (X) preferably comprises the following:

(X1) from 15 to 60 weight percent of a polyalkylene phthalate polyester polymer or copolymer continuous phase and;
(X2) from 40 to 85 weight percent of a polyethylene/(meth) acrylate rubber dispersed phase wherein the rubber is dynamically cross-linked with a peroxide free radical initiator and an organic diene co-agent.

In a preferred embodiment, the polyalkylene phthalate polyester polymer or copolymer (X1) of the continuous phase of the TPV component (X) is selected from the group consisting of polyalkylene terephthalate, polyalkylene terephthalate copolymer, and a block copolyester elastomer, such as a copolyether-ester block copolymer elastomer or a copolyester-ester block copolymer elastomer.

In a further preferred embodiment, the organic diene co-agent in TPV component (X) is selected from the group consisting of diethylene glycol diacrylate, ethylene glycol dimethacrylate, diethylene glycol dimethacrylate, N,N'-m-phenylene dimaleimide, triallylisocyanurate, trimethylolpropane trimethacrylate, tetraallyloxyethane, triallyl cyanurate, tetramethylene diacrylate, polyethylene glycol dimethacrylate, and the like. Preferably the organic diene co-agent is selected from diethylene glycol diacrylate, diethylene glycol dimethacrylate, N,N'-m-phenylene dimaleimide, and triallylisocyanurate.

The free-radical initiator used in the TPV component (X) is preferably selected from the group consisting of 2,5-dimethyl-2,5-di-(t-butylperoxy)hexyne-3, t-butyl peroxybenzoate, 2,5-dimethyl-2,5-di-(t-butylperoxy)-2,5-dimethylhexane, dicumyl peroxide, α,α-bis(t-butylperoxy) 2,5-dimethylhexane, and the like. Preferred free-radical initiators are 2,5 dimethyl-2,5-di-(t-butylperoxy)hexyne-3; 2,5-dimethyl-2,5-di-(t-butylperoxy) hexane; or t-butyl peroxybenzoate.

In a particularly preferred embodiment, TPV component (X) is as follows: the polyalkylene phthalate polyester polymer or copolymer (X1) is a block copolymer of segments of poly(butylene terephthalate) and segments of poly(tetramethylene glycol), the rubber (X2) is an ethylene/methylacrylate copolymer elastomer, the peroxide free-radical initiator is 2,5-dimethyl-2,5-di-(t-butylperoxy) hexyne-3 and the organic diene co-agent is diethylene glycol dimethacrylate.

The specific combination of a block copolymer of segments of poly(butylene terephthalate) and segments of poly (tetramethylene glycol) along with an ethylene/methylacrylate copolymer elastomer, 2,5-dimethyl 2,5-di-(t-butylperoxy) hexyne-3 or 2,5-dimethyl-2,5-di-(t-butylperoxy)hexane free-radical initiator and diethylene glycol dimethacrylate co-agent produces a highly dispersed rubber phase with excellent properties.

TPV component (X) may be compounded using processes such as those described in WO 2004/029155. An example is a process comprising the steps of:
(a) adding and admixing a cross-linkable polyethylene/(meth)acrylate vulcanisate rubber, a peroxide free-radical initiator and an organic diene co-agent in a melt extruder or melt blender at a temperature insufficient to promote significant cross-linking;
(b) adding a polyalkylene terephthalate polyester polymer or copolymer to the melt extruder or melt blender and admixing the polyalkylene terephthalate polyester polymer with the cross-linkable polyethylene/(meth)acrylate vulcanisate rubber prior to cross-linking;
(c) further mixing the cross-linkable polyethylene/(meth) acrylate vulcanisate rubber with peroxide free-radical initiator and an organic diene co-agent with the polyalkylene terephthalate polyester polymer or copolymer at conditions and temperature sufficient to cross-link the cross-linkable polyethylene/(meth)acrylate vulcanisate rubber; and
(d) recovering a TPV component (X) comprising from 15 to 60 weight percent of the polyalkylene terephthalate polyester polymer or copolymer as a continuous phase and from 40 to 85 weight percent of the polyethylene/(meth) acrylate vulcanisate rubber cross-linked with the peroxide free radical initiator and the organic diene co-agent as a disperse phase.

The TP component (Y) preferably comprises the following:
(Y1) at or about 5-25% by weight of a block copolyester elastomer;
(Y2) at or about 40-65% by weight of poly(butylene terephthalate);
(Y3) at or about 5-20% by weight of an ionomer [preferably selected from random copolymers of ethylene and acrylic acid or methacrylic acid [poly(ethylene-co-methacrylic acid)], wherein the acid moieties are neutralised from at or about 10 to 100 mol % with a counterion selected from $Na^+$ and $Zn^{++}$; and
(Y4) at or about 5-30% by weight of a terpolymer of ethylene, butylacrylate (BA) and glycidylmethacrylate (GMA);
provided that:
(1) the total of the 4 components (Y1) to (Y4) is 100%; and
(2) the total of (Y1) and (Y2) does not exceed 70 wt %.

The terpolymer (Y4) in component (Y) is preferably selected from terpolymers of ethylene, butylacrylate (BA) and glycidylmethacrylate (GMA), wherein the three components are present in at or about the following weight percentages: 50-98 wt % ethylene, 1-40 wt % n-butyl acrylate, and 1-15 wt % glycidylmethacrylate. Suitable terpolymer may be purchased under the trade name Elvaloy® (DuPont, Wilmington, USA).

In a preferred embodiment, the TP component (Y) comprises the following:

(Y1) 10-25% by weight of a copolyether-ester block copolymer elastomer which comprises a copolyether-ester having about 84% by weight of poly(butylene terephthalate) and about 16% by weight poly(tetramethylene glycol);

(Y2) 40-65% by weight of poly(butylene terephthalate) having a number average molecular weight of at least at or about 7500;

(Y3) at or about 5%-20% by weight of an ionomer comprising at least 50% by weight of ethylene, 5-15% by weight of acrylic acid or methacrylic acid, and 0-35% by weight of a moiety selected from at least one of methyl acrylate, isobutyl acrylate and n-butyl acrylate, and further wherein the acid groups are neutralized from 30-70% by at least one metal ion selected from sodium and zinc, preferably sodium;

(Y4) 2-30% by weight of a terpolymer of at least 50% by weight ethylene, 1-15% by weight of glycidyl methacrylate, and 1-35% by weight of n-butyl acrylate;

provided that: (1) the total of the 4 components (Y1) to (Y4) is 100%; and (2) the total of (Y1) and (Y2) does not exceed 70%.

The TP component (Y) may be compounded using techniques known in the art, such as those described in European patent no. EP 0 614 475 (equivalent to U.S. Pat. No. 5,824,412), incorporated herein by reference.

Suitable TP component (Y) can be purchased under the trade name Hytrel® (DuPont, Wilmington, USA).

In a particularly preferred embodiment, the polymer blend of the invention has the following composition:
At or about 17 wt % of block copolyester elastomer (A1);
At or about 46 wt % of a poly(butylene terephthalate) (PBT);
At or about 5 wt % of a cross-linked acrylate rubber;
At or about 9 wt % of an ionomer; and
At or about 23 wt % of a terpolymer of ethylene, butylacrylate (BA) and glycidylmethacrylate (GMA);
wherein the weight percentages are based on the sum of the above ingredients.

In another particularly preferred embodiment, the polymer blend of the invention has the following composition:
At or about 23 wt % of block copolyester elastomer (A1);
At or about 38 wt % of a poly(butylene terephthalate) (PBT);
At or about 13 wt % of a cross-linked acrylate rubber;
At or about 8 wt % of an ionomer; and
At or about 19 wt % of a terpolymer of ethylene, butylacrylate (BA) and glycidylmethacrylate (GMA);
wherein the weight percentages are based on the sum of the above ingredients.

In another particularly preferred embodiment, the polymer blend of the invention has the following composition:
At or about 32 wt % of block copolyester elastomer (A1);
At or about 26 wt % of a poly(butylene terephthalate) (PBT);
At or about 25 wt % of a cross-linked acrylate rubber;
At or about 5 wt % of an ionomer; and
At or about 13 wt % of a terpolymer of ethylene, butylacrylate (BA) and glycidylmethacrylate (GMA);
wherein the weight percentages are based on the sum of the above ingredients.

In another particularly preferred embodiment, the polymer blend of the invention has the following composition:
At or about 41 wt % of block copolyester elastomer (A1);
At or about 13 wt % of a poly(butylene terephthalate) (PBT);
At or about 38 wt % of a cross-linked acrylate rubber;
At or about 3 wt % of an ionomer; and
At or about 6 wt % of a terpolymer of ethylene, butylacrylate (BA) and glycidylmethacrylate (GMA);
wherein the weight percentages are based on the sum of the above ingredients.

In another particularly preferred embodiment, the polymer blend of the invention has the following composition:
At or about 46 wt % of block copolyester elastomer (A1);
At or about 5 wt % of a poly(butylene terephthalate) (PBT);
At or about 45 wt % of a cross-linked acrylate rubber;
At or about 1 wt % of an ionomer; and
At or about 3 wt % of a terpolymer of ethylene, butylacrylate (BA) and glycidylmethacrylate (GMA);
wherein the weight percentages are based on the sum of the above ingredients.

The polymer blend of the invention may be shaped or moulded like a thermoplastic. It may be extruded, injection-moulded and blow-moulded, and is particularly suited to blow-moulding.

The polymer blend of the invention has excellent oil-resistance and high temperature resistance (e.g. up to about 170° C.), making it particularly suited for use in internal combustion engines, particularly in the automotive field. Examples of parts that may be made with the polymer blend of the invention include: automotive ducts and hoses, CVJ boots, seals, and body plugs.

EXAMPLES

The following components were used to compound polymer blends of the invention:

Copolyether-ester Y1: a copolyether-ester block copolymer elastomer consisting of about 84 wt % of poly(butylene terephthalate) and about 16 wt % of long chain poly(tetramethylene glycol), having a melt flow rate of about 13 g/10 min at 240° C. under 2.16 kg load.

PBT Y2: PBT with a melt flow rate of about 45 g/10 min at 250° C. under 2.16 kg load.

Ionomer Y3: a copolymer of 66.9% by weight ethylene, 24.5% by weight of n-butyl acrylate, and 8.6% by weight of methacrylic acid neutralized at about 50% with Na ion. This ionomer has a density of 0.94 g/cc and a melt flow rate of about 1.0 g/10 min at 190° C. under 2.16 kg load.

Terpolymer Y4: a copolymer of 64.9% by weight ethylene, 28% by weight n-butyl acrylate, and 5.25% by weight of glycidyl methacrylate, having a density of 0.94 g/cc and a melt flow rate of about 20 g/10 min at 190° C. under 2.16 kg load.

Hytrel® 40CB: a masterbatch of fine particle size carbon black in a Hytrel® polymer matrix, commercially available from DuPont (Wilmington, USA).

Hytrel® 30HS: a masterbatch of heat stabilisers in a Hytrel® polymer matrix, commercially available from DuPont (Wilmington, USA).

AO1: a blend of commercially available phenolic antioxidant and phosphite stabiliser.

AO2: a blend of commercially available primary and secondary anti-oxidants and a metal deactivator.

Copolyether-ester X1: a copolyether-ester block copolymer elastomer consisting of about 60 wt % hard segments of poly(butylene terephthalate) and about 40 wt % soft segments of long chain poly(tetramethylene glycol), having a melt flow rate of about 8 g/10 min at 220° C. under 2.16 kg load.

Rubber X2: polyethylene/acrylate elastomer (gum rubber type) derived from copolymerisation of ethylene and 63 wt % methyl acrylate commercially available as Vamac® from DuPont (Wilmington, USA).

Method A

In Method A, a TPV component (X) is mixed in the melt with a TP component (Y).

TPV Component (X)

A TPV component (X), wherein the rubber phase is already cross-linked, was prepared on a twin-screw compounder according to the method of WO 2004/029155, using the following ingredients:

| TPV Component (X) | |
|---|---|
| Ingredient | wt % |
| Copolyether-ester X1 | 46.5 |
| Rubber X2 | 43.5 |
| Hytrel ® 30HS | 5 |
| Hytrel ® 40CB | 1 |
| AO1 | 0.5 |
| diethylene glycol dimethacrylate | 2 |
| 2,5-dimethyl-2,5-di-(t-butylperoxy) hexyne-3 | 1.5 |

The TPV component (X) can be considered as consisting of about 46% vulcanised rubber phase intimately dispersed in a thermoplastic copolyether-ester phase.

TP Component (Y)

A TP component (Y) was compounded using known methods (see for example EP 0 614 475, equivalent to U.S. Pat. No. 5,824,412), using the following ingredients:

| TP component (Y) | |
|---|---|
| Ingredient | wt % |
| Copolyether-ester Y1 | 12.8 |
| PBT Y2 | 47.2 |
| Ionomer Y3 | 9.4 |
| Terpolymer Y4 | 23.6 |
| Hytrel ® 40CB | 1.8 |
| Hytrel ® 30HS | 1.4 |
| AO2 | 3.8 |

Examples 1-5 and Comparative Example 6

TPV component (X) and TP component (Y) were mixed in various proportions, shown in Table 1.

Examples 1-5 are polymer blends of the invention. Comparative Example 6 is the conventional TPV component (X), of the type described in WO 2004/029155.

Method B

In method B, the ingredients X1 and X2 listed above for TPV component (X) and Y1 to Y4 for the TP component (Y) are mixed in a batch melt blender at a temperature at which all thermoplastic components are melted. The highest melting point being about 225° C. for PBT, the melt temperature is preferably within the range of 230-290° C. Once a homogeneous mixture is obtained, as can be inferred from an essentially constant torque reading on the melt blender, the free-radical initiator and the organic diene co-agents are introduced to initiate Dynamic Cross-linking of the dispersed rubber phase. Curing is continued until a new steady torque reading is obtained. The other ingredients and stabilisers can be introduced either in the rubber and plastic melt prior to cure, or in the TPV after curing. The final TPV is cooled and formed into sheets or granules for further testing and use.

Method C

In method C, the ingredients X1 and X2 listed above for TPV component (X) and Y1 to Y4 for the TP component (Y) are mixed in a melt compounder in presence of the free radical initiator and the organic diene co-agent. Any type of melt compounder can be used, but twin-screw extruders and so-called Buss kneaders are preferred.

Temperature profile along the compounder, feeding point of the various ingredients, screw design and operating parameters of the compounder are selected to achieve sufficient melting and dispersion prior to cross-linking of the vulcanisable rubber. In a way similar to the process described in WO 2004/029155, microtome cross sections of articles made from the final TPV, as well as measurement of mechanical properties of injection-moulded specimens, can be used to help optimising the compounding process.

TABLE 1

Composition of polymer blends of Examples 1-5 and Comparative Example 6

| | Example no. | | | | | Comparative |
|---|---|---|---|---|---|---|
| | 1 | 2 | 3 | 4 | 5 | Example 6 |
| TPV Component (X) | 10 | 25 | 50 | 75 | 90 | 100 |
| TP Component (Y) | 90 | 75 | 50 | 25 | 10 | 0 |
| Copolyether-ester content | 17.6 | 22.7 | 31.1 | 39.6 | 44.6 | 48 |
| PBT (Y2) content | 42.5 | 35.4 | 23.6 | 11.8 | 4.7 | 0 |
| Vulcanised rubber content | 4.6 | 11.5 | 23.0 | 34.5 | 41.4 | 46 |
| Ionomer (Y3) content | 8.5 | 7.1 | 4.7 | 2.3 | 0.9 | 0 |
| Terpolymer (Y4) content | 21.2 | 17.7 | 11.8 | 5.9 | 2.4 | 0 |

In Table 1, all numbers are weight percent relative to the total composition. The copolyether-ester content takes into account the amounts from the ingredients (X1) and (Y1), and the amounts from the two masterbatches Hytrel® 40CB and Hytrel® 30HS.

Mechanical Properties

The mechanical properties of the polymer blends of Examples 1-5 and Comparative Example 6 were determined using injection-moulded tensile specimens having 2 mm thickness and 5 mm width in the narrow portion (geometry ISO 5A). Measurements of tensile properties were done according to ISO 527. The average values obtained from 10 specimens are listed in table 2. Shore D hardness was measured according to ISO 868, using three stacked tensile specimens. The average of three determinations, rounded to the nearest unit, is shown in Table 2.

It can be seen that the polymer blends of the invention have higher Young's modulus, higher tensile strength and higher strain at break than a conventional TPV (Comparative Example 6). Such a combination is unexpected for polymeric materials: instead, it is generally observed that composition changes leading to higher modulus and higher strength also lead to a decrease in strain at break.

Compared to a conventional TPV, such a combination of stiffness, strength and strain at break makes the polymer blends of this invention more suitable for applications where load bearing capability is important, as for example CVJ boots or tubes and ducts under internal pressure or under depression. In practical terms, the higher Young's modulus results in smaller part deformations for a given load and geometry, or alternatively it enables to reduce wall thickness for a given load and maximum allowed deformation. The higher tensile strength provides opportunities to work with higher loads at constant geometry (e.g. a higher internal pressure for a duct or hose) or enables to reduce wall thickness for a given load.

TABLE 2

Tensile properties of polymer blends of the examples and the comparative example

| | Example no. | | | | | Comparative Example 6 |
|---|---|---|---|---|---|---|
| | 1 | 2 | 3 | 4 | 5 | |
| Young's modulus [MPa] | 449 | 372 | 215 | 72 | 40 | 27 |
| Stress at 10% strain [MPa] | 18.5 | 15.9 | 11.4 | 6.3 | 4.7 | 4.2 |
| Tensile strength [MPa] | 22.9 | 20.1 | 16.9 | 12.3 | 10.0 | 9.5 |
| Strain at break [%] | 191 | 185 | 204 | 189 | 190 | 170 |
| Hardness [Shore D, 1 s] | 64 | 63 | 56 | 42 | 36 | 34 |

Blow-moulding Behaviour: Extrusion Blow-moulding

The blow-moulding behaviour of the polymer blends of Examples 1-5 and Comparative Example 6 was tested in extrusion blow-moulding. The purpose is to evaluate the melt strength of the materials, i.e. their ability to form a parison that does not elongate (or sag) unacceptably under its own weight.

The evaluation was performed using a Battenfeld-Fischer extrusion blow-moulding machine equipped with a screw having 60 mm diameter and 1200 mm length. Barrel and die temperatures were set in a way that the melt temperature measured with a hand probe is 248+/−3° C. With the screw turning at a constant speed of 31 rpm, the parison is extruded through a circular die with an outer diameter of 23.8 mm and a core pin diameter of 18.4 mm.

During its descent from the die towards the floor, the advance of the parison was measured in the following way: the parison was cut at the die exit and this defined the time as zero, then the time was recorded when the lowest point of the parison moved by 0.2 m (t2), and then when it has moved by 1 m (t10). Four such measurements were made and the average times were used to calculate the sag ratio (SR), defined as:

$$SR = 0.2(t10)/(t2)$$

A material with no sag would have a constant parison drop speed, hence a sag ratio equal to one. Therefore, the closer the SR is to the value 1, the higher is the melt strength of the composition as a parison.

The melt temperature and the sag ratio are reported in Table 3.

Although the sag ratio of the examples 1 to 5 is not as high as the sag ratio of the comparative example 6, all examples can still be processed by extrusion blow-moulding. Blow-moulded parts with a length of about 50 cm were obtained easily under the processing conditions indicated.

TABLE 3

Blow-moulding evaluation of blends of the examples and the comparative example

| | Example no. | | | | | Comparative Example 6 |
|---|---|---|---|---|---|---|
| | 1 | 2 | 3 | 4 | 5 | |
| Melt temperature [° C.] | 250 | 248 | 247 | 246 | 245 | 246 |
| Sag ratio [—] | 0.40 | 0.44 | 0.52 | 0.55 | 0.58 | 0.61 |
| Parts 0.5 m long | Yes | Yes | Yes | Yes | Yes | Yes |

What is claimed is:

1. A process for making a polymer blend suitable for blow moulding, comprising compounding in a melt extruder at a temperature sufficient to melt and mix all components:
  thermoplastic vulcanisate (X) component comprising:
    (X1) from 15 to 60 weight percent of polyalkylene terephthalate polyester polymer or copolymer continuous phase, and
    (X2) from 40 to 85 weight percent of rubber disperse phase comprising poly(meth)acrylate or a polymer comprised of ethylene and methyl acrylate, said rubber being dynamically cross-linked with an organic peroxide free radical initiator and an organic diene co-agent;
  together with thermoplastic polyester component (Y) comprising:
    (Y1) from about 5 to about 25 weight percent of a copolyether —ester block copolymer elastomer;
    (Y2) from about 40 to about 65 weight percent of poly(butylene terephthalate)
    (Y3) from about 5 to about 20 weight percent of an ionomer, said ionomer comprising copolymers of ethylene and methacrylic acid, the ionomer having acid moieties from about 10 to 100 mol percent neutralized; and
    (Y4) from about 5 to about 30 weight percent of terpolymer of ethylene, butylacrylate and glycidylmethacrylate;
  the total of (Y1), (Y2), (Y3) and (Y4) being 100% by weight;
  the total of (Y1) and (Y2) not exceeding 70% by weight.

2. A batch process for making a polymer blend suitable for blow moulding, comprising the following steps:
  (1) mixing in a batch melt blender:
    20 to 70 weight percent of a mixture (A) comprising:
      (A1) block copolyester elastomer, and
      (A2) poly(butylene terephthalate);
    2 to 60 weight percent of rubber comprising poly(meth)acrylate or polymer comprised of ethylene and methyl acrylate, said rubber being capable of being dynamically cross-linked;
    0.5 to 20 weight percent of ionomer, comprising copolymers of ethylene and methacrylic acid, the ionomer having acid moieties from about 10 to 100 mol percent neutralized; and
    1 to 30 weight percent of terpolymer of ethylene, butylacrylate and glycidylmethacrylate;
    the mixing taking place at a temperature sufficient to melt all the components to make a homogeneous melt; and
  (2) adding organic diene co-agent and a free-radical initiator and continuing the mixing until the cross-linking of the rubber is essentially completed.

3. A continuous process for making a polymer blend suitable to blow moulding, comprising the following steps:
  (1) mixing in a continuous melt blender:
    20 to 70 weight percent of a mixture (A) of two or more polyalkylene phthalates, wherein the mixture (A) is a mixture comprising:
(A1) block copolyester elastomer, and
(A2) poly(butylene terephthalate);
2 to 60 weight percent of rubber comprising poly(meth)acrylate or polymer comprised of ethylene and methyl acrylate, said rubber capable of being dynamically cross-linked;
0.5 to 20 weight percent of ionomer, comprising copolymers of ethylene and methacrylic acid, the ionomer having acid moieties from about 10 to 100 mol percent neutralized;

1 to 30 weight percent of terpolymer of ethylene, butylacrylate and glycidylmethacrylate, organic diene co-agent and a free-radical initiator; and (2) heating at a temperature sufficient to melt all the components to make a homogeneous melt and continuing the mixing until the cross-linking of the rubber is essentially completed.

\* \* \* \* \*